United States Patent [19]

Mouille

[11] Patent Number: 5,242,266
[45] Date of Patent: Sep. 7, 1993

[54] GYROCRAFT ARTICULATED ROTOR HEAD WITH INTERMEDIATE SLEEVES BETWEEN HUB AND BLADES

[75] Inventor: René L. Mouille, Villa La Pinède, France

[73] Assignee: Aerospatiale Societe Nationale Industrielle, Paris, France

[21] Appl. No.: 806,399

[22] Filed: Dec. 13, 1991

[30] Foreign Application Priority Data

Dec. 27, 1990 [FR] France .................. 90 16360

[51] Int. Cl.⁵ ............................................. B64C 27/38
[52] U.S. Cl. .................. 416/134 A; 416/140; 416/141
[58] Field of Search .......... 416/131, 134 A, 140, 416/141

[56] References Cited

U.S. PATENT DOCUMENTS

| | | | |
|---|---|---|---|
| 4,407,633 | 10/1983 | Mouille | 416/141 |
| 4,504,193 | 3/1985 | Mouille | 416/134 A |
| 4,568,245 | 2/1986 | Hibyan et al. | 416/134 A |
| 4,568,246 | 2/1986 | Hibyan et al. | 416/134 A |
| 4,652,210 | 3/1987 | Leman et al. | 416/134 A |
| 4,868,962 | 9/1989 | McArdle et al. | 416/134 A |
| 4,915,585 | 4/1990 | Guimbal | 416/141 |
| 4,930,983 | 6/1990 | Byrnes et al. | 416/134 A |

FOREIGN PATENT DOCUMENTS 0080920  6/1983  European Pat. Off. .
0201008  12/1986  European Pat. Off. .

Primary Examiner—John T. Kwon
Attorney, Agent, or Firm—Nikaido Marmelstein Murray & Oram

[57] ABSTRACT

Gyrocraft rotor head including a hub connected to each blade (2) of the rotor by a linking member which is integral with the blade (2) and which is linked to the hub body by a laminated spherical stop. Each blade (2) is fitted with an assembly (20) for elastic recall in drag with incorporated damping, one of whose extremities (22) is linked to the member linking the blade to the hub body. The linking member is constituted by an intermediate sleeve (11) comprising one part in the form of a ring (12) and one part fitted with at least one double clevis (14), the intermediate sleeve (11) being a single integral assembly of which the ring (12) surrounds the laminated spherical stop with which it is integrated and of which the double clevis or clevises interact with the structure for integration of the blade (2).

27 Claims, 2 Drawing Sheets

GYROCRAFT ARTICULATED ROTOR HEAD WITH INTERMEDIATE SLEEVES BETWEEN HUB AND BLADES

BACKGROUND OF THE INVENTION

The present invention relates to the rotors of gyrocraft, and it concerns more particularly articulated rotors whose blades are connected to the hub body of the rotor head by means of linking members of the intermediate sleeve type.

The invention relates especially to the rotors of helicopters, of which each blade is linked to the hub of the rotor by linking means comprising advantageously one single articulation for flapping, for drag and for pitch and which are equipped with a device for elastic recall and damping of the blades in drag.

In the best mode of embodiment of the rotor to which the invention relates, the single articulation for flapping, for drag and for pitch which is comprised by the means of articulation of each blade to the rotor of the hub is advantageously an articulation of the type commonly called "laminated spherical stop". This laminated spherical stop comprises an alternating stacking, in the form of a spherical portion, which is arranged between two armatures rigidly linked, one to the hub, and the other to an intermediate sleeve for linking the foot of the blade to the hub. The alternating stacking in the form of a spherical portion is constituted by rigid dishes and by leaves of an elastic material which transmits in compression the centrifugal forces of the blade onto the hub body and allows the angular oscillations of the blade in flapping, in drag and in pitch.

In order to adapt the natural frequency of the blades in drag and to damp the angular oscillations of the blades in drag, the rotor to which the invention relates comprises elements for elastic recall with incorporated damping which are linked between each blade and the hub or between neighboring blades, and which take the form of tie-rods. According to the invention, each assembly for elastic recall with incorporated damping can have an architecture which corresponds to the description below. The assemblies for elastic recall with incorporated damping have the form of a tie-rod, which comprises a central elongated plate, flat and rigid, which is engaged at least partially between two external elongated plates, flat and rigid and in the same direction. The central plate is linked to each of the two external plates by a layer of a visco-elastic material which is bonded to the two plates which it links. The central plate has a pivot eye tip at one end which extends on one side, in the direction of the elongated plates, and beyond the external plates; while the external plates have on the other side, a pivot eye tip which extends in the direction of the elongated plates beyond the central plate.

DESCRIPTION OF THE PRIOR ART

Two examples of gyrocraft rotors, fitted with an element for linking between each blade and the hub body, are described in the U.S. Pat. No. 2,456,034, and between blades in the French Patent Application 88.05 816, each one in the name of the Applicant, as well as in the U.S. Pat. No. 4,568,246.

In the French Patent 2,456,034, which is an addition to the French Patent 2,427,251, the hub comprises a central shaft, which extends the mast of the rotor, and which carries an upper radial plate and a lower radial plate. The external radial support of each laminated spherical stop for retention and articulation of a blade onto the hub is embedded between the radial edges of the two plates. This external radial support is fixed directly onto these edges, in the fashion of a rigid brace. The foot of each blade is joined to the other rigid support, or internal radial support, of the corresponding laminated spherical stop by a clevis, which is arranged radially. This clevis has two radial branches, which are spaced one in another in the direction of the axis of the rotor, and which are hollowed out for the free passage of the external radial support of the laminated spherical stop, which is partially housed between the branches of this radial clevis and between the two radial plates of the hub. Each strut for recall in drag is also produced in this document in the form of an alternating stacking of rigid elongated plates and of layers of visco-elastic material, and it is coupled by its two extremities in the longitudinal direction, and by the use of ball-and-socket joints, on the one hand onto the clevis associated with the corresponding blade, and, on the other hand, at a point on the central shaft of the hub. Each blade comprises at least one brace, which is fixed between the two plates, in the interval between their hollow parts, and the fixing means of the foot of the corresponding blade to the extremities furthest from the hub of the plates of the said clevis. The plates of the clevis are, in part, embedded in the other rigid element of the corresponding spherical stop to which they are fixed. The two plates of each blade as well as the brace are made fast to each other by fixing spindles, which are substantially perpendicular to the plane of the rotor. Finally, each brace has an extension onto which is mounted the articulation axle of the extremity of the pitch control lever of the said blade. This brace also comprises, on the opposite side, another extension onto which is fixed the ball-and-socket joint of the extremity of the corresponding strut.

In the French Patent Application No. 88.05 816, the gyrocraft rotor comprises a hub on which each blade of the rotor is retained by a linking member, which is integral with the blade, and which is linked to the hub by use of means of articulation, which allow the angular oscillations of the blade around three perpendicular and convergent axes of flapping, of drag and of pitch. The rotor also comprises a device for interblade linking, which comprises elongated tie-rods for elastic recall with damping incorporated. These tie-rods are equal in number to the number of blades, and they are mounted substantially in a crown-shape around the hub. Each member for linking a blade to the hub is a radial clevis, which comprises one upper branch and one lower branch, which are arranged opposite one another and which are spaced from one another in the direction of the axis of drag of the corresponding blade. The external radial extremities form a fork into which is engaged the foot of the corresponding blade. The internal radial extremities of this clevis are integrated with an internal radial armature of the means of articulation onto the hub of the rotor. These means of articulation also comprise an external radial armature which is fixed onto the hub, and which is arranged between the two upper and lower branches of the clevis. One branch links these two branches on the side of the external radial extremities, and serves as an attachment point for the two adjacent tie-rods. Finally, one bracing part is arranged between the lower and upper branches in their mid-part, in such a manner as to have an extension onto which is mounted the pitch control lever.

The U.S. Pat. No. 4,568,246 concerns a particular gyrocraft hub concept, which is constituted by an assembly of elements in composite material. The body of the hub is thus constituted by circular pieces fitted with radiating parts, and by pieces assembled at its periphery, and which are connected to each blade by a junction element. Each junction element comprises two stirrups: an internal stirrup connected to the body of the hub, and an external stirrup linked to the corresponding blade. The internal stirrup has two branches which are connected by a base, which penetrate into the interior of the hub body with which it is integral. The external stirrup also comprises two symmetrical branches which are connected by a vertical wall. Each of the branches of the internal stirrup is terminated at its extremity by two parallel wings in such a manner as to constitute a mortice, which is intended to receive the tenon constituted by the corresponding extremity of the branch of the external stirrup. Each branch of the external stirrup thus penetrates into the interior of the extremities of the internal stirrup with which they are integrated by means of bolt-type fixing elements. On the other hand, the external stirrup is terminated on the side of the blade by flat extremities provided with holes, which are intended to serve as the means of assembly between this external stirrup and the corresponding blade.

The different devices described in the patents above thus make use of gyrocraft rotors, which are filtered with elements for joining between each blade and the hub body. Each of these joining elements, which can be metallic or in composite material, is constituted by a large number of elements which are linked to one another by means of assembly such as bolts, which can perhaps fulfill the role of axes of articulation.

Gyrocraft rotors are also known which make use of structures whose characteristics are improved by the arrangement at the periphery of the latter of belt-type pieces, which are intended to reinforce the basic element; such is the case in the French Patents Nos. 2,529,860 and 2,584,996 in the name of the Applicant.

The French Patent 2,529,860 describes a gyrocraft rotor in which the hub body is constituted by two plates in composite material, which are linked to one another by a central shaft in a bracing arrangement. This hub is coupled to the foot of each blade by the use of a laminated spherical stop, and of a strut for elastic recall and damping of the blade in drag. Each of the upper and lower plates is produced in composite material and comprises a flange which is surrounded by a reinforcement banding.

In the French Patent 2,584,996, the rotor mast and the hub are produced in the form of an integrated, tubular mast-hub, of a single piece, which has, for each blade of the rotor, one or two lateral openings which are crossed respectively by one of the two internal radial branches, or by two branches of a forked piece for attachment of the blade to the hub. The internal radial extremities of the two branches are rigidly linked to the internal radial support of the corresponding laminated spherical stop, which is at least partially housed in the interior of the integrated tubular mast-hub, such that its external radial support is fixed to the peripheral part of the integrated tubular mast-hub. The Integrated tubular mast is shaped into a rim which is surrounded by a composite reinforcement banding, and to which the opening for each blade, or each of the two openings for each blade, is adjacent. Each blade is linked to the body of the hub by a junction element, which is constituted by two main plates, which are linked to one another by bolt-type assembling elements. Moreover, these junction elements comprise in their central part a bracing which is also fixed by bolts onto the two plates, and which comprises an extension intended to receive the pitch control lever. This latter type of gyrocraft rotor also makes use of junction elements, which are relatively complex and constituted by a large number of pieces integrated with one another by assembly elements.

SUMMARY OF THE INVENTION

The aim of the present invention is to remedy the different drawbacks described above, and to propose an architecture for a gyrocraft rotor in which the hub body is linked to each of the blades by junction elements which have the lowest possible mass and the simplest possible form, in such a manner as to be able to combine it with means for improving the mechanical characteristics, of the reinforcement and safety banding type.

The gyrocraft rotor according to the invention is of the type comprising a hub body connected to each blade of the rotor by the use of a linking member. Each of these linking members is integral with the corresponding blade, and it is linked to the hub by means of articulation, which allow the angular oscillations of the corresponding blade around three axes of flapping, of drag and of pitch. Each of these blades is fitted with a strut for elastic recall in drag with incorporated damping, one of whose extremities is linked to this blade, and whose other extremity is connected to the hub or to another blade. According to the invention, each linking member is constituted by an intermediate sleeve, which comprises one internal part in the form of a ring, and one part fitted with at least one double clevis. The intermediate sleeve is a single and same integral assembly, whose ring surrounds the means of articulation with which it is integrated, and whose double clevis or clevises interact with means of integration of the blade.

Advantageously, each of the intermediate sleeves is constituted by a body, which comprises on one hand a rigid ring whose longitudinal axis corresponds to the axis of the blade, and on the other hand, two double clevises, which are arranged on either side of this longitudinal axis. The upper double clevis is situated substantially above the ring, and the lower double clevis is situated substantially below this ring.

In order to work as well as possible with each of the blades, the corresponding intermediate sleeve comprises two double clevises, which permits folding of the blades of the rotor by undoing one of the two double clevises with the corresponding blade and turning the blade around the clevis which has not been undone.

In order to improve the characteristics of the mechanical behaviour of each of these intermediate sleeves counter to the centrifugal forces generated by the rotation of the blades, the ring comprises a housing which is provided into its periphery in such a manner as to receive a belt of reinforcing banding. In the same way, the upper double clevis can also comprise a housing provided into its periphery in such a manner as to also receive a belt of reinforcing banding; as well as the lower double clevis which can comprise a housing provided into its periphery in such a manner as to itself receive a belt of reinforcing and safety banding. These different reinforcing bandings give a greater safety in service and a "fail-safe" character, this being essentially counter to the centrifugal traction forces which load it in temporary fatigue at a very high level of stresses.

According to a first variant of the invention these different reinforcing bandings can be arranged in a housing which is of rectangular cross-section. According to another variant of the invention, these reinforcing bandings are then arranged in a housing which is of square cross-section.

In the different configurations described above, the intermediate sleeve is in metal, for preference in steel or in titanium alloy.

In order to get the best out of this structure, which comprises reinforcing bandings, the latter can be constituted by a multi-layer winding of fine metallic wires, for example in steel with very high mechanical strength, the said winding being wrapped by a flexible material, for example an elastomer. For preference, the bandings are produced in composite filamentary material constituted by unidirectional fibers with high mechanical strength in traction agglomerated by a thermosetting synthetic resin and put in place by winding. Preferably, this composite filamentary material is constituted by aramid-type rovings which are agglomerated by an epoxy-type resin.

In a preferential structure of the invention, the gyrocraft rotor has intermediate sleeves, which are linked to the hub by means of articulation produced in the form of a laminated spherical stop. Each laminated spherical stop has an internal armature which is integral with this intermediate sleeve, and has an external armature which is integral with the hub body.

Advantageously, the body of the hub of a gyrocraft rotor according to the invention comprises two elements whose planes are substantially parallel to one another and perpendicular to the axis of the mast-rotor. These two elements are separated from one another by a space of sufficient size as to permit the housing of the laminated spherical stops. The two elements can be rings; an external ring and an internal ring each forming a rigid rim, and which are linked by a thin wall of substantially cylindrical form. This thin wall is arranged at the periphery of these rings, and it comprises at least as many openings as there are blades. Each opening has dimensions sufficient for the passage of the spherical stop and the linking members of the corresponding blade, with their angular clearance.

In this configuration of the invention, each of the laminated spherical stops has its external armature, which is linked to the two rings by the use of fixing means. These fixing means consist in at least one bolted linking shaft, which goes through each of the corresponding bores and the external armature of the laminated stop.

In order to link the laminated spherical stop with the corresponding intermediate sleeve, this laminated spherical stop comprises a slot which is provided into its internal armature, in such a manner as to be capable of receiving the ring of the intermediate sleeve, which thus comes to be housed in this slot. Moreover, the ring is maintained in this internal armature by means of a screwed plate in such a fashion as to come to be locked into the slot provided into the internal armature.

According to the invention, the upper double clevis and the lower double clevis of each of the intermediate sleeves each comprise two bores. Each bore in the upper double clevis faces a corresponding bore in the lower double clevis in such a manner as to be capable of receiving the means of integration with the corresponding blade, along an axis which is substantially parallel to the axis of the mast-rotor.

In order to best fulfill its function, each of the intermediate sleeves also comprises means of linking with the system for pitch control, and means of linking with the assembly for elastic recall with damping incorporated of the corresponding blade in drag.

Preferably, means of linking with the system for pitch control are produced in the form of a pitch control lever, which is integral with the corresponding intermediate sleeve, and which interacts with a pitch control rod. This pitch control lever is constituted by a lateral leg which extends in a direction laterally inclined toward the exterior of the intermediate sleeve and in the direction of the axis of the hub. This lateral leg has at its extremity two branches which are situated on each side in such a fashion as to constitute a clevis in which the pitch control rod is retained. According to a first variant of the invention, this pitch control lever and the intermediate sleeve form only one single, and same integral piece. According to a second variant of the invention this pitch control lever is an independent piece, which is mounted between two lugs provided onto the intermediate sleeve, and with which it is integrated by means of bolts.

Advantageously, each of the intermediate sleeves comprises means of linking with the assembly for elastic recall with incorporated damping of the corresponding blade in drag, which are produced in the form of a clevis cooperating with the corresponding extremity of this assembly for damped elastic recall. In this configuration, the intermediate sleeve has at its lower part and at its upper part a lug. These two lugs constitute the clevis, which is intended to receive the corresponding articulation at the attachment point of the extremity of the corresponding assembly for damped elastic recall. This articulation of the attachment point is constituted by an articulation axle, which is mounted in a hole provided into each of the lugs. This articulation axle is also engaged on the other hand in a hole which is arranged at the extremity of the corresponding assembly for elastic recall. The holes of each of the lugs as well as the hole in the extremity are arranged in such a manner that the articulation axle is substantially parallel to the axis of the hub. According to a first variant of the invention, the clevis and the intermediate sleeve form a single, and same integral piece. According to a second variant of the invention, the clevis is an independent piece, which is mounted on the intermediate sleeve, and with which it is integrated by means of bolts.

The invention offers the possibility of having a gyrocraft rotor, whose intermediate sleeves comprise flapping stops. Each of these intermediate sleeves thus comprises a top flapping stop and a bottom flapping stop. The top flapping stop is supported directly on the upper ring. The bottom flapping stop itself comes to be supported on a metallic reinforcement, which is mounted on the lower ring by the use of the vertical linking axle. This metallic reinforcement is arranged between the lower face of this lower ring and the corresponding washer. Moreover, this metallic reinforcement is shaped and curved to follow and match the lower and vertical contour of the lower ring.

More precisely, each of the intermediate sleeves has a top flapping stop finger, which is provided in the form of a boss. This boss is substantially rectilinear and perpendicular to the longitudinal axis of the ring of this intermediate sleeve. The boss is in the extension of the upper clevis, and it is connected to the upper face of the ring in such a manner that this connecting face constitutes the abutment surface of the top flapping stop finger.

Preferentially, each intermediate sleeve has its bottom flapping stop, which is retractable and which is constituted by a bottom stop lever. This bottom stop lever is arranged between two lower lugs which are connected to the lower double clevis of the intermediate sleeve. Moreover, these two lower lugs are substantially parallel to the longitudinal plane of the ring. These two lugs are face to face in such a manner as to constitute a clevis, and they each have a hole into which is mounted an articulation axle for the retractable bottom stop lever.

The subject of the present invention is thus a gyrocraft rotor which is equipped with intermediate sleeves between the blades and the hub body, these intermediate sleeves being preferably metallic and being capable of being fitted with safety winding in filamentary composite. This architecture offers the advantage of being able to fold the blades of the rotor, by making them pivot around one of the two blade attachment pins. These intermediate sleeves according to the invention also offer the advantage of comprising the pitch control lever on the one side, and, on the other hand, the attachment clevis of the assembly for elastic recall in drag with incorporated damping. This lever and this clevis can be of an integral piece or connected onto this intermediate sleeve. Moreover, the structure of these intermediate sleeves according to the invention comprises housings of oval shape and rectangular or square cross-section in order to wind around a reinforcing banding of steel wires or of rovings of fibers with high strength such as aramid fibers which are agglomerated with a polymerizable resin. These reinforcing bandings bring to this essential piece a greater safety in service and a "fail-safe" character, that is to say essentially counter to the centrifugal traction forces which load it at a very high stress level. The reinforcing bandings which are arranged on the one hand on the ring at the interior of which is housed the laminated spherical stop, and on the other hand on the two double clevises for attachment of the blade, thus offer the advantage of permitting the centrifugal traction to pass directly from the two reinforcing bandings of the clevises for attachment of the blades into the reinforcing banding of the ring comprising the laminated spherical stop, and this by a direct and very short route into the metallic part which provides with link between these two reinforcing bandings.

Finally, as regards the production of these intermediate sleeves according to the invention which are complex pieces, it can be seen that, after finishing the machining of the metallic part, these three reinforcing bandings achieved by winding can be made easily, since the access for each winding is completely clear and that it is sufficient to turn the piece on a suitable tool in order to produce these windings in a very simple fashion.

Other advantages will appear from the invention, which will be better understood with the aid of the description given below of particular examples of embodiment, described in a non-limitative way, by referring to the attached drawings on which:

DESCRIPTION OF THE PREFERRED EMBODIMENTS

Figure 1:
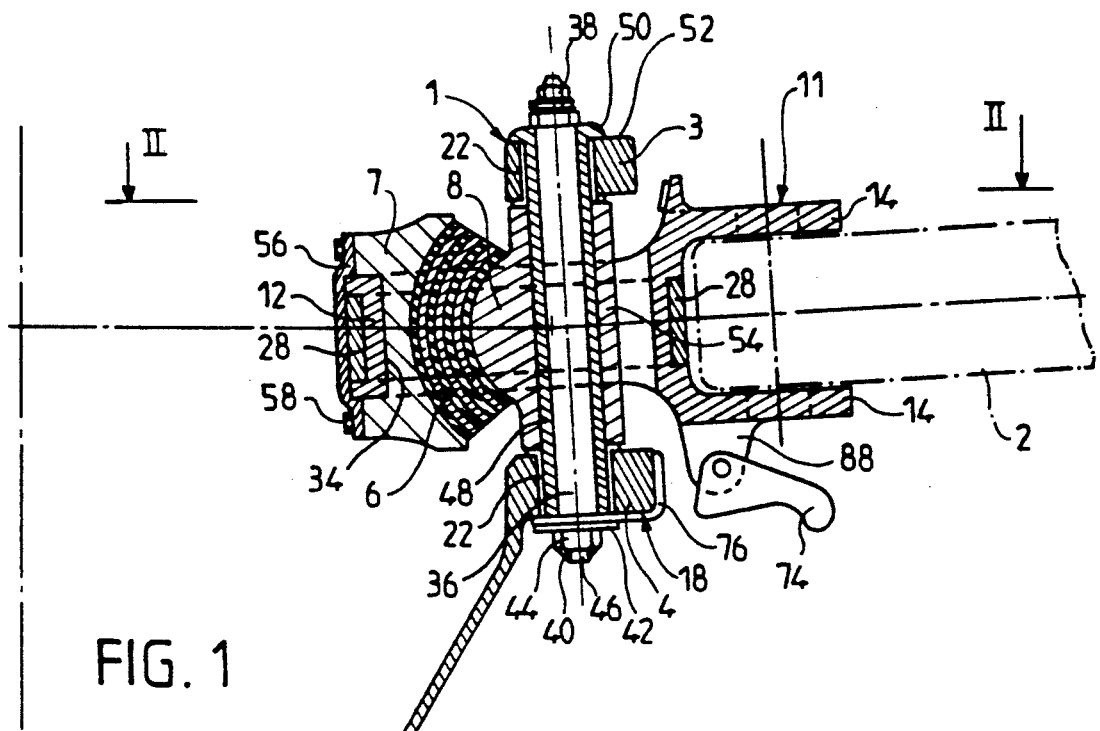
FIG. 1 is a view in axial section of the assembly of a gyrocraft rotor head in which the hub body is connected to each blade by an intermediate sleeve according to the invention, the section plane passing through the plane I—I of FIG. 2.

The gyrocraft rotor head according to the invention comprises a hub body 1 which is connected to each blade 2 of the rotor by the use of a linking member. Each linking member is integral with the corresponding blade 2, and it is linked to the hub body by a laminated spherical stop 6, which permits angular oscillations of the blade 2 in flapping, drag and pitch around the center of the laminated stop 6. The gyrocraft rotor head also comprises a device for damping and for elastic return in drag of the blades. In this device, each blade is equipped with an assembly for elastic return with incorporated damping 20, one of whose extremities is linked to the corresponding blade 2, and whose other extremity is linked to the hub or to a neighboring blade. According to the invention, each linking member is constituted by an intermediate sleeve 11, which comprises essentially one part in the form of a ring 12, and one part which is fitted with at least one double clevis 14. According to a fundamental characteristic of the invention, each intermediate sleeve constitutes a single, and same integral piece. The ring 12 of this integral piece surrounds the laminated spherical stop of the corresponding blade, with the internal armature with which it is integrated; and the double clevis or clevises 14 are linked to the corresponding blade 2 by means of integration.

The intermediate sleeve 11 is constituted by a body 16, which comprises on one hand a ring 12, and on the other hand one or two double clevises 14. The ring 12 is of elongated form and it has its longitudinal axis corresponding to the axis of the blade 2. According to the embodiment of the invention represented in the figures, the body 16 comprises two double clevises 14, which are situated on either side of the plane comprising the longitudinal axis of this intermediate sleeve. The upper double clevis 14 is arranged substantially above the upper part of the ring 12, while the lower double clevis 14 is situated substantially below the lower face of this ring 12. The intermediate sleeve 11 according to the invention is metallic, and it is for preference produced in steel or in titanium alloy.

Figure 3:
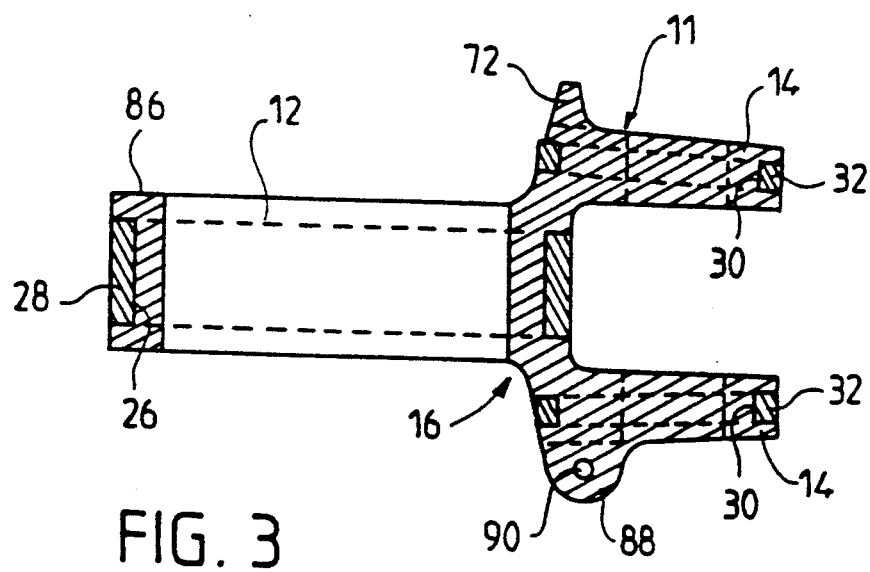
FIG. 3 is a view in axial section of an intermediate sleeve according to the invention, the section plane passing through the plane III—III of FIG. 4.

In order to improve the mechanical behavior characteristics of this intermediate sleeve, the ring 12 comprises a housing 26 which is provided into its periphery and which opens out to the exterior. This housing 26 is intended to receive a reinforcing banding 28. In the same fashion, as shown in FIG. 3, the upper double clevis 14 also comprises a housing 30 which is provided into its periphery and which opens out to the exterior, in such a manner as to be capable of receiving a reinforcing banding 32. Finally, the lower double clevis 14 can also comprise a housing 30 which is provided into its periphery and which opens out to the exterior, this housing 30 being intended to receive the reinforcing banding 32. This arrangement of a reinforcing banding 28 around the ring and the reinforcing banding 32 around each of the two upper 14 and lower 14 double clevises is particularly useful, for it permits, in a very short distance, the centrifugal traction received on the two windings of the double clevises 14 at the reinforcing banding 28 of the ring 12, to pass directly into the body 16. These reinforcing bandings 28 and 32 are mounted into the corresponding housing 26 and 30, the latter being of rectangular cross-section according to one variant of the invention, or being of square cross-section according to another variant of the invention.

These reinforcing bandings 28 and 32 which are mounted as a belt can be produced by a multi-layer winding of fine metallic wires, for example in steel with very high mechanical strength, the said winding being wrapped in a flexible material such as an elastomer. For preference, these reinforcing bandings are in a composite filamentary material constituted by unidirectional fibers with high mechanical strength in traction agglomerated by a thermosetting synthetic resin and put in place by winding into the corresponding housing 26 and 30. Preferably, this composite filamentary material is constituted by aramid-type rovings which are agglomerated by an epoxy-type resin.

Each laminated spherical stop 6 which constitutes the single articulation member of the blade onto the hub body is of a well-known type, and it comprises a central part, which is associated with an internal armature 7 and an external armature 8. The central part is constituted by an alternating stacking of rigid layers, which are generally metallic, and of layers of elastomer in the form of a spherical cap. This central part is bonded on the one hand, in the internal radial position, onto the convex face of the spherical cap of the external armature 8, and on the other hand, in the external radial position, onto the concave face of the spherical cap of the internal armature 7 of the laminated spherical stop 6. The internal armature 7 is integral with the corresponding intermediate sleeve 11, while the external armature 8 is integral with the hub body 1 of the gyrocraft rotor.

The body of the hub 1 of the gyrocraft rotor comprises two elements 3 and 4, which have planes substantially parallel with respect to one another, and which are perpendicular to the axis of the mast-rotor 5. These two elements 3 and 4 are separated from one another by a space, with a size sufficient to permit the housing therein of the laminated spherical stops 6. These laminated spherical stops 6 have their internal armature 7 which is integral in movement with the foot of the corresponding blade 2, and they have their external armature 8 which is fixed with regard to these two elements 3 and 4. Each external armature 8 is arranged in the neighborhood of the periphery of these elements 3 and 4, in such a manner as to constitute a rigid brace. The two elements 3 and 4 are rings: an external ring 3 and an internal ring 4, which each form a rigid rim, and which are linked by a thin wall 9. This thin wall 9 is of substantially cylindrical form, and it is arranged at the periphery of these rings 3 and 4. Moreover, this thin wall 9 comprises at least as many openings 24 as there are blades 2. Each opening 24 must have dimensions sufficient for the passage of the corresponding laminated spherical stop 6 as well as for the passage of the linking members of the corresponding blade 2, with their angular clearance.

The laminated spherical stops 6 are mounted in the hub body 1 by the use of fixing means, which connect the armatures of each of these laminated spherical stops 6 to the two external 3 and internal 4 rings of the hub body 1. These fixing means consist of a vertical linking axle, which comes to be fixed into each of the bores 22 which are provided into the external 3 and internal rings 4, in such a manner as to constitute the rigid bracing of each of the laminated spherical stops 6. Each vertical linking axle is constituted by a cylindrical stalk 36 which is fitted at its upper extremity with a hexagonal head 38, and at its lower extremity with a thread 40. This thread 40 receives a washer 42 and a nut 44, which is locked by a pin 46. The cylindrical stalk 36 is mounted into a bracing 48, which engages in each of the bores 22 provided into the external 3 and internal 4 rings and which also engages into a bore 54 which is provided into the exterior armature 8. The cylindrical stalk 36 is fitted with an annular flange 50, which comes to fit on the upper face 52 of the external ring 3, while the washer 42 fits against the lower face 18 of the internal ring 4, and the hexagonal head 38 of the cylindrical stalk 36 fits against the annular flange 50.

Each of the intermediate sleeves 11 has its ring 12 which is integral with the corresponding laminated spherical stop 6, and it has also its double clevises 14 which are connected to the corresponding blade 2. The internal armature 7 of the laminated spherical stop 6 comprises a slot 34, into which comes to be mounted and housed the ring 12 of the corresponding intermediate sleeve 11. This ring 12 is held in position in and against this internal rigid element 7 by means of a plate 56, which is held by two screws 58 coming to be fixed into this internal armature 7. Each bore 60 of the upper double clevis 14 faces the corresponding bore 60 in the lower double clevis 14. These bores 60 receive the means of integration of the blade 2 along an axis which is substantially parallel to the axis of the mast-rotor 5. These means of integration are constituted by pins which engage into the bores 60 of the upper double clevis 14, then into the blade 2, and finally into the bores 60 of the lower double clevis 14.

Each of the intermediate sleeves 11 according to the invention comprises moreover means of linking with the system for pitch control of the corresponding blade 2, as well as means of linking with the assembly 20 for elastic recall with incorporated damping of the blade 2.

Figure 2:
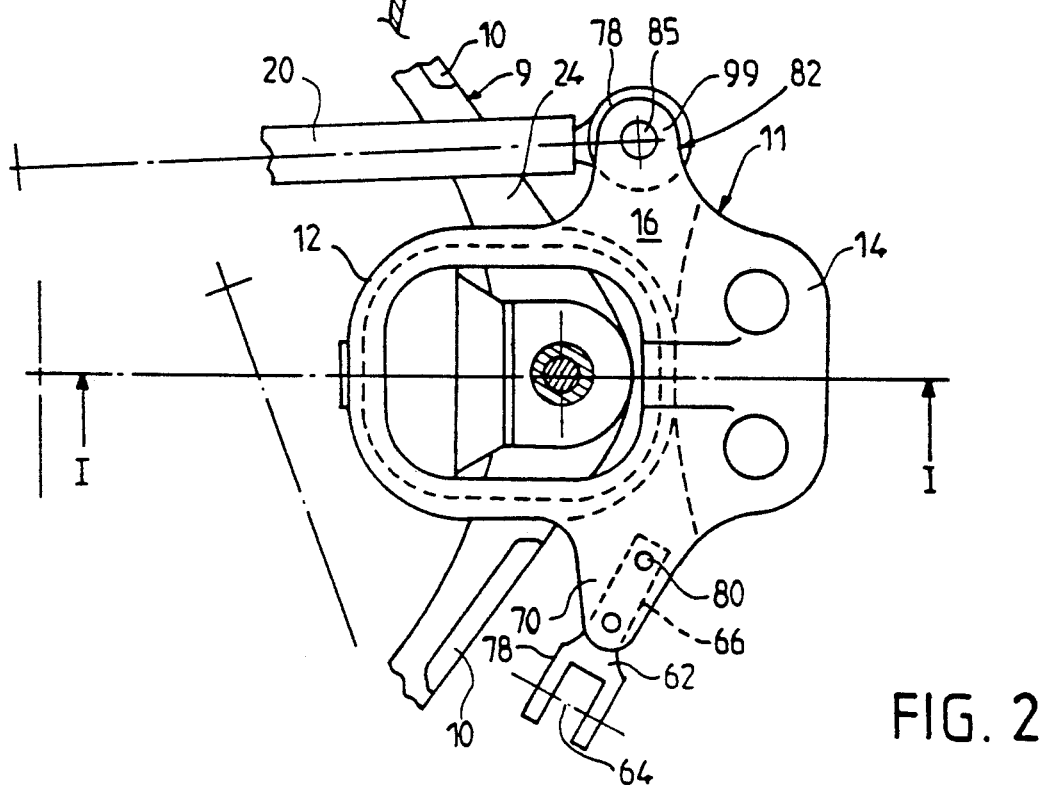
FIG. 2 is a view in partial section of FIG. 1 through the plane II—II.
Figure 4:
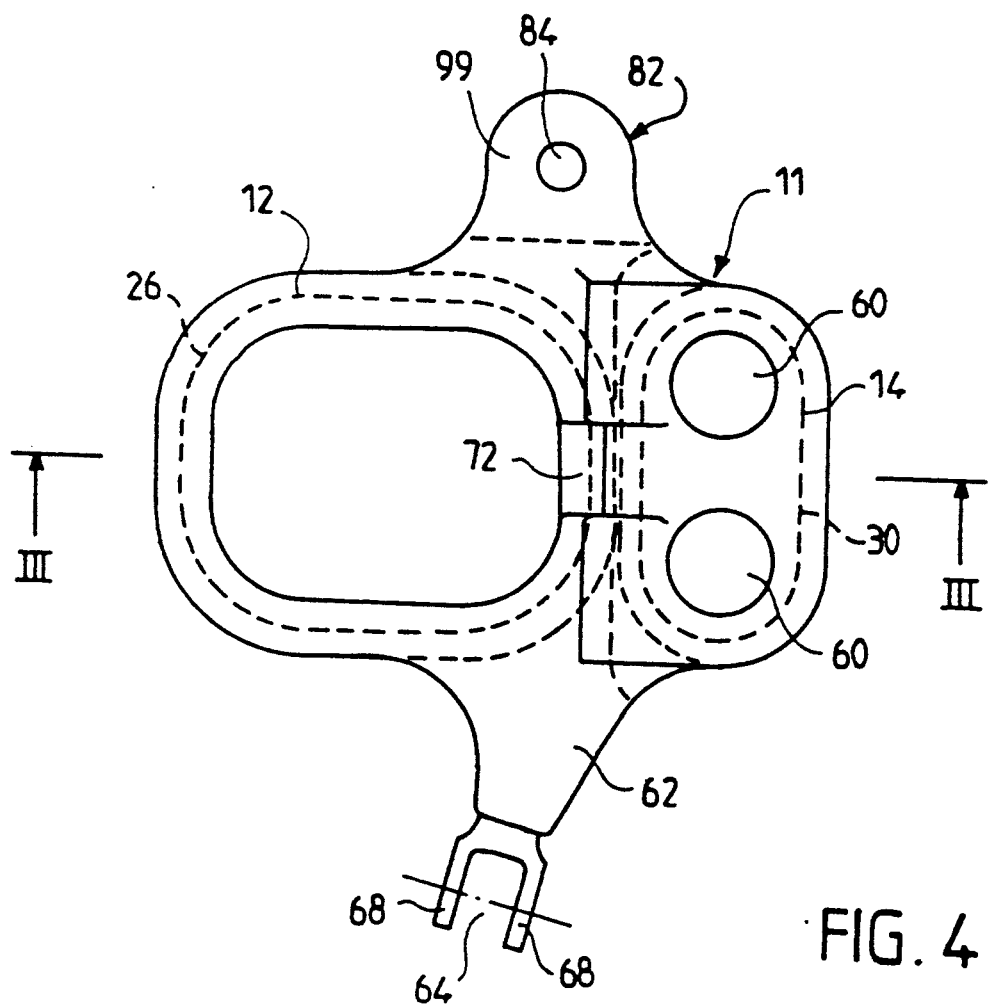
FIG. 4 is a view from above of the intermediate sleeve of FIG. 3.

The means of linking with the system for pitch control are produced in the form of a pitch control lever 62, integral with the intermediate sleeve 11, and which cooperates with the rod for pitch control 64. This pitch control lever 62 is constituted by a lateral leg 66, which extends toward the exterior of the intermediate sleeve 11, along a direction which is laterally inclined along that of the axis of the rotor hub. This lateral leg 66 has at its extremity two branches 68, which are situated on either side of this extremity, in order to constitute a clevis in which is retained the rod 64 for pitch control. In the embodiment represented in FIG. 4, the pitch control lever 62 and the intermediate sleeve 11 form a single, and same integral piece. In another embodiment, represented in FIG. 2, the pitch control lever 62 is an independent piece, which terminates on the side opposite the two branches 68 in a tenon, which is mounted between two lugs 70 of the intermediate sleeve 11. These two lugs 70 form an integral part of the intermediate sleeve 11 with which they form a single and same piece, and they are integrated with the pitch control lever 62 by means of bolts 80 which penetrate into the holes provided into the tenon of the pitch control lever 62 and in each of the two lugs 70.

The linking means of each of the intermediate sleeves 11 with the assembly 20 for elastic recall with incorporated damping of the corresponding blade 2 consist of a clevis 82, which is integral with the said intermediate sleeve 11, and which cooperates with the corresponding extremity of the assembly 20 for elastic recall with incorporated damping. The clevis 82 is constituted by two lugs 99: a lug 99 arranged at the upper part of the intermediate sleeve 11, and a lug 99 arranged at the lower part of this same intermediate sleeve 11. The two lugs 99 are face to face, in such a manner that they constitute the clevis 82, which is intended to receive the corresponding articulation of the attachment point of the extremity of the assembly 20 for elastic recall with incorporated damping. In a first embodiment of the intermediate sleeve 11, each of the lugs 99 of the clevis 82 forms an integral part of the intermediate sleeve 11 with which they form a single and same integral piece. In another embodiment of the invention, which is not shown in the figures, the two lugs 99 which constitute the clevis 82 belong to an independent piece which is mounted in the intermediate sleeve 11, and with which it is integrated by means of bolts.

The attachment of each of the assemblies 20 for elastic recall with incorporated damping into the corresponding intermediate sleeve 11 is constituted by an articulation axle which is mounted into the two lugs 99. More precisely, this articulation axle is engaged in a hole 84 provided into the upper lug 99, then it penetrates into a hole 85 provided into the extremity of the assembly 20 for elastic recall with incorporated damping and, finally, it goes through a hole 84 which is provided into the lower lug 99. These holes 84 and the hole 85 are arranged in such a manner that the articulation axle should be substantially parallel to the axis of the hub.

The gyrocraft rotor comprising intermediate sleeves 11 according to the invention can also have blade flapping stops, as well as blade drag stops.

As can be seen in FIG. 1, the intermediate sleeve 11 according to the invention comprises a top flapping stop, as well as a bottom flapping stop. The top flapping stop is directly supported on the external element 3 of the hub body 1, while the bottom flapping stop comes to be supported on a metallic reinforcement 76, which is mounted on the internal ring 4 of the said hub body 1. This metallic reinforcement 76 is mounted by the use of the vertical linking shaft, that is to say the cylindrical stalk 36, and it is arranged between the lower face 18 of the internal ring 4, and the washer 42. Moreover, this metallic reinforcement 76 is shaped and curved to follow the lower and the vertical contours of this ring 4. The intermediate sleeve 11 has at its upper part, above the upper double clevis 14, and on the side of the ring 12, a top flapping stop finger 72. This finger 72 is provided in the form of a boss which is substantially rectilinear and which is perpendicular to the longitudinal axis of the ring 12. This boss is provided in the extension of the upper double clevis 14 and it is connected to the upper face 86 of the ring 12. This connecting face constitutes the stop face of the top flapping stop finger 72, and it comes to press against the upper ring 3 when the flappings are of too great an amplitude. Still according to FIG. 1, the bottom flapping stop is of the retractable type, and it forms an integral part of the intermediate sleeve 11 according to the invention. This bottom flapping stop is constituted by a bottom stop lever 74, which is arranged between two lower lugs 88, which belong to the intermediate sleeve 11. These two lower lugs 88 are connected to the lower face of the lower double clevis 14, and they are substantially parallel to the longitudinal plane of the ring 12. These two lugs 88 are face to face in such a manner that they constitute a clevis, which is intended to receive the articulation of the bottom stop lever 74. For this reason, each of the two lugs 88 is fitted with a hole 90, each of these holes 90 facing another hole 90 in such a manner as to define an axis which should be substantially perpendicular to the longitudinal axis of the intermediate sleeve 11. The articulation axle of the retractable bottom stop lever 74 is mounted in these two holes 90, in such a manner that this bottom stop lever may articulate freely around this articulation axle while being held axially by its two lugs 88.

The gyrocraft rotors according to the invention which are equipped with intermediate sleeves 11 offer for these essential pieces the greatest safety in use and a particularly significant "fail-safe" character, this essentially counter to the centrifugal traction forces which load them at a very high level of stresses. In fact, the structure of these intermediate sleeves 11, which is an integral structure, comprises housings into which are winded reinforcing bandings, of the type of bandings of metallic wires or rovings of fibers with high strength, agglomerated with a polymerizable resin. The architecture according to the invention of these intermediate sleeves 11 is characterized by the presence of three reinforcing bandings, a reinforcing banding for the ring 12 and a reinforcing banding for each of the double clevises 14. The presence of these reinforcing bandings 28 and 32 considerably improves the behavior of the piece, especially with regard to the centrifugal traction which thus passes from the two reinforcing bandings 32 of the double clevises 14 of the blades 2 directly into the reinforcing banding 28 of the ring 12, that is to say the reinforcing banding 28 for loading of the laminated spherical stop 6; this is effected by a direct and very short route in the part of the body which provides the link between these two reinforcing bandings 32 and 28.

What is claimed is:

1. A gyrocraft rotor head of the type comprising a hub body connected to each blade (2) or a rotor by the use of a linking member which is integral with the blade (2) and which is linked to the hub by articulation means for permitting angular oscillations of the corresponding blade (2) around three mutually perpendicular and convergent axes of flapping, of drag, and of pitch, each blade (2) being fitted with an elongated assembly for elastic recall in drag with incorporated damping (20), one of whose extremities is linked to the corresponding blade (2), and whose other extremity is linked to one of the hub and another blade, wherein the linking member is constituted by an intermediate sleeve (11) comprising one part in the form of a ring (12), and one part fitted with at least one double clevis (14), the intermediate sleeve (11) being a single integral assembly, whose ring (12) surrounds the means of articulation with which it is integral, and whose at least one double clevis (14) cooperates with means of integration of the blade (2), wherein the intermediate sleeve (11) comprises means of linking with the pitch command system, provided in the form of a pitch control lever (62) integral with said intermediate sleeve (11) and cooperating with a pitch control (64) rod, wherein the intermediate sleeve (11) comprises means of linking with the assembly (20) for elastic recall in drag with incorporated damping of the corresponding blade (2), provided in the form of a clevis (82) cooperating with the corresponding extremity of the assembly (20), and wherein said means of articulation comprises a laminated spherical stop (6) whose internal armature (7) is integral with said intermediate sleeve (11) and whose external armature (8) is integral with the hub body (1).

2. The rotor head as claimed in claim 1, wherein the intermediate sleeve (11) is in metal.

3. The rotor head as claimed in claim 1, wherein the intermediate sleeve (11) is in steel.

4. The rotor head as claimed in claim 1, wherein the intermediate sleeve (11) is in titanium alloy.

5. The rotor head as claimed in claim 1, wherein the intermediate sleeve (11) comprises two double clevises (14).

6. The rotor head as claimed in claim 5, wherein the intermediate sleeve (11) comprises a body (16), which includes a ring (12) having a longitudinal axis corresponding to the axis of the blade (2), and two double clevises (14), arranged on either side of said longitudinal axis, including an upper double clevis (14) being situated substantially above the ring (12) and a lower double clevis (14) being situated substantially below the said ring (12).

7. The rotor head as claimed in claim 6, wherein the ring (12) comprises a reinforcing banding (28), and a housing (26) provided in the periphery of the ring to receive said reinforcing banding (28).

8. The rotor head as claimed in claim 6, wherein the lower and upper double clevises (14) each comprise a reinforcing banding (32), and a housing (30) provided the respective periphery to receive said reinforcing banding (32).

9. The rotor head as claimed in claim 7, wherein the housing (26, 30) is of rectangular cross-section.

10. The rotor head as claimed in claim 7, wherein the housing (26, 30) is of square cross-section.

11. The rotor head as claimed in claim 7, wherein the reinforcing banding (28, 32) is constituted by a multilayer winding of steel wires with very high mechanical strength, the winding wrapped in an elastomer.

12. The rotor head as claimed in claim 7, wherein the reinforcing banding (28, 32) is in filamentary composite material.

13. The rotor head as claimed in claim 12, wherein the filamentary composite material is constituted by a winding of rovings of mineral or synthetic fibers with high mechanical strength in traction, agglomerated by a hot-polymerized synthetic resin.

14. The rotor head as claimed in claim 13, wherein the fibers with high mechanical strength for winding are of the aramid type and wherein the resin is of the epoxy type.

15. The rotor head as claimed in claim 1, wherein the internal armature (7) of the laminated spherical stop (6) comprises a groove (34) into which comes to be housed the ring (12) of the intermediate sleeve (11) which is held against the said internal armature (7) by a plate (56) held by two screws (58) being fixed into this internal armature (7).

16. The rotor head as claimed in claim 1, wherein the upper (14) and the lower (14) double clevis each comprise two bores (60), each bore (60) of the upper double clevis (14) facing a corresponding bore (60) in the lower double clevis (14) in such a manner as to receive the means of integration of the blade (2) along an axis substantially parallel to the axis of the mast-rotor (5).

17. The rotor head as claimed in claim 1, wherein the pitch control lever (62) is constituted by a lateral leg (66) extending along a direction laterally inclined toward the exterior of the intermediate sleeve (11) and in the direction of the axis of the hub, said lateral leg (66) having at its extremity two branches (68) situated on each side in such a manner as to constitute a clevis in which the rod (64) for pitch control is retained.

18. The rotor head as claimed in claim 17, wherein the pitch command lever (62) and the intermediate sleeve (11) form a single integral piece.

19. The rotor head as claimed in claim 17, wherein the pitch control lever (62) is an independent piece which is mounted between two lugs (70) of the intermediate sleeve (11) with which it is integrated by bolts (80).

20. The rotor head as claimed in claim 1, wherein the intermediate sleeve (11) possesses at its lower part and at its upper part a lug (99), the two lugs (99) being face to face and constituting the clevis (82) for the corresponding articulation at the attachment point of the extremity of the assembly for elastic recall (20).

21. The rotor head as claimed in claim 20, wherein the articulation of the attachment point is constituted by an articulation axle mounted in a hole provided into each of the two lugs (99), this articulation axle engaging in a hole (84) arranged at the extremity of the assembly for elastic return (20), the holes (84) being arranged in such a manner that the articulation axle should be substantially parallel to the axis of the hub.

22. The rotor head as claimed in claim 20, wherein the clevis (82) and the intermediate sleeve (11) form a single integral piece.

23. The rotor head as claimed in claim 20, wherein the clevis (82) is an independent piece which is mounted on the intermediate sleeve (11) with which it is integrated by bolts.

24. The rotor head as claimed in claim 1, wherein the intermediate sleeve (11) comprises flapping stops.

25. The rotor head as claimed in claim 24, wherein the flapping stops include a top flapping stop and a bottom flapping stop, the top stop being supported directly on an external ring (3) of the hub body and the bottom stop coming to be supported on a metallic reinforcement (76) mounted on an internal ring (4) of the hub body via of the vertical linking shaft between a lower face (18) of the internal ring (4) and a washer (42) adjacent thereto, the metallic reinforcement (76) being shaped and curved to follow the lower and vertical contour of the internal ring (4).

26. The rotor head as claimed in claim 24, wherein one of the flapping steps of the intermediate sleeve (11) is a top flapping stop finger (72), provided in the form of a boss substantially rectilinear and perpendicular to the longitudinal axis of the ring (12), this boss being in the extension of the upper double clevis (14) and being connected to the upper face (86) of the ring (12) in such a manner that this connecting face constitutes the stop surface of the top flapping stop finger.

27. The rotor head as claimed in claim 24 wherein one of the flapping stops of the intermediate sleeve (11) is a bottom flapping stop which is retractable and is constituted by a bottom stop lever (74) arranged between two lower lugs (88) connected to the lower branch of the double clevis (14), and substantially parallel to the longitudinal plane of the ring, being face to face in such a manner as to constitute a clevis and each having a hole (90) in which is mounted articulation shaft for the retractable bottom stop lever (74).

* * * * *